(12) United States Patent
Cieslinski

(10) Patent No.: US 8,531,566 B2
(45) Date of Patent: Sep. 10, 2013

(54) IMAGE SENSOR AND OPERATING METHOD

(75) Inventor: Michael Cieslinski, Ottobrunn (DE)

(73) Assignee: Arnold & Richter Cine Technik GmbH & Co., Betriebs KG (DE)

( * ) Notice: Subject to any disclaimer, the term of this patent is extended or adjusted under 35 U.S.C. 154(b) by 299 days.

(21) Appl. No.: 12/900,115

(22) Filed: Oct. 7, 2010

(65) Prior Publication Data
US 2011/0242375 A1 Oct. 6, 2011

(30) Foreign Application Priority Data
Oct. 13, 2009 (DE) .................. 10 2009 049 201

(51) Int. Cl.
*H04N 3/14* (2006.01)
*H04N 17/00* (2006.01)
*H04N 5/217* (2011.01)
*H01L 27/00* (2006.01)
*H01L 31/062* (2012.01)

(52) U.S. Cl.
USPC ........... 348/308; 348/294; 348/187; 348/307; 348/241; 250/208.1; 257/291; 257/292

(58) Field of Classification Search
USPC ................. 348/308, 294, 187, 246, 302, 241, 348/307, 247, 248; 250/208.1, 214.1, 214 R; 257/291, 292, 294, 308
See application file for complete search history.

(56) References Cited

U.S. PATENT DOCUMENTS

| 6,366,312 B1 * | 4/2002 | Crittenden .................... 348/187 |
| 6,797,933 B1 | 9/2004 | Mendis et al. |
| 2008/0169414 A1 | 7/2008 | Li |
| 2010/0177227 A1 | 7/2010 | Cieslinski |

FOREIGN PATENT DOCUMENTS

| DE | 196 26 427 A1 | 1/1997 |
| EP | 0334058 B1 | 5/1995 |
| EP | 0 915 619 A1 | 5/1999 |
| EP | 1076453 A2 | 2/2001 |
| WO | 9104498 A1 | 4/1991 |

OTHER PUBLICATIONS

German Search Report dated Sep. 1, 2010 of German Patent Application No. 1020090492011 w/English Translation of the same.
Lizarraga, et al., Experimental validation of a BIST technique for CMOS active pixel sensors, 27th IEEE VLSI Test Symposium, 2009, pp. 189-194, IEEE Computer Society.
Stoppa, et al., Novel CMOS Image Sensor With a 132-dB Dynamic Range, IEEE Journal of Solid-State Circuits, Dec. 2002, pp. 1846-1852, vol. 37, No. 12.

(Continued)

*Primary Examiner* — Nhan T Tran
*Assistant Examiner* — Marly Camargo
(74) *Attorney, Agent, or Firm* — Amster, Rothstein & Ebenstein

(57) ABSTRACT

The present invention relates to an image sensor, in particular a CMOS image sensor, for electronic cameras, having a plurality of light-sensitive pixels arranged in rows and columns, wherein all or at least some of the pixels of a column are connected to a respective common column line, and wherein the image sensor has a signal preprocessing device for one or more of the column lines to process a exposure signals generated by the pixels which can be applied to the respective column line. The image sensor is made selectively to apply one of at least two test input signals to the column lines.

24 Claims, 3 Drawing Sheets

(56) References Cited

OTHER PUBLICATIONS

Massari, et al., A CMOS Image Sensor With Programmable Pixel-Level Analog Processing, IEEE Transactions on Neural Networks, Nov. 2005, pp. 1673-1683, vol. 16, No. 2.

Snoeij, et al., Multiple-Ramp Column-Parallel ADC Architectures for CMOS Image Sensors, IEEE Journal of Solid-State Circuits, Dec. 2007, pp. 2968-2977, vol. 42, No. 12.

Beiderman, et al., An advanced CMOS Imager Employing Modified AR and ACS methods, IEEE Sensors 2008 Conference, 2008, pp. 1386-1389.

Vogelsong, et al., Scientific/Industrial Camera-on-a-Chip using Active Column Sensor™ CMOS imager core, In Sensors and Camera Systems for Scientific Industrial, and Digital Photography Applications, Proceedings of SPIE, (2000), vol. 3965, pp. 102-113, Download from SPIE Digital Library on Aug. 25, 2010.

European Search Report relating to European Patent Application No. 10 013 479.0 dated Jan. 21, 2011 and English translation of the same.

* cited by examiner

IMAGE SENSOR AND OPERATING METHOD

SUMMARY OF THE INVENTION

The present invention relates to an image sensor, in particular a CMOS image sensor, for electronic cameras, having a plurality of light-sensitive pixels arranged in rows and columns, wherein all or at least some of the pixels of a column are connected to a respective common column line, and wherein the image sensor has a respective signal preprocessing device for one or more of the column lines to process a exposure signals generated by the pixels which can be applied to the respective column line.

Known electronic cameras include an image sensor which comprises a plurality of light-sensitive elements or pixels which are arranged in rows and columns and which convert light incident trough an objective of the camera into electrical signals. For the reading out of an image, each of the pixels is addressed and a signal which is proportional to a charge of the pixel collected by an exposure (so-called exposure signal) is directed to an output of the image sensor and is converted into a digital signal.

To read out an image, the pixels are addressed row-wise by means of a common row line and are output via signal preprocessing devices arranged at the end of the column lines and are digitized with the help of analog/digital converters present on the sensor or external.

To reduce the influence of different offset levels of the pixels, also called fixed pattern noise (FPN), two values are usually read out from each pixel, i.e. two exposure signals are produced, namely a signal value which is produced with an exposed pixel and a reference value which is produced with an unexposed and reset pixel and represents an offset signal (corresponding to an exposure of zero). The signal value and the reference value are supplied to a difference amplifier which is a component of the signal preprocessing device. The actual image signal is acquired from the difference of the signal value and the reference value and can subsequently be further processed. Such a process is also called correlated double sampling (CDS).

Electronic cameras are today increasingly used in the production of cinema movies. In this application, very high costs occur as a rule for actors and the production crew. It is therefore very important that the cameras used operate without error.

In defective electronic cameras, above all those faults are particularly disadvantageous which are not immediately recognized. Whereas a total failure of an electronic camera is easily recognizable and the respective camera is replaced, faults which only cause minor image interference and are due e.g. to dirt on the sensor, a change in the characteristics of electronic components or increased noise may possibly initially remain unrecognized.

Such image interference can nevertheless become clearly visible on a projection of the cinema film on a large screen and may even be amplified by subsequent image corrections carried out in postproduction.

When image interference occurs, the affected images must be subsequently manually retouched in a laborious process. In the worst case, the shoot will have to be repeated, which is associated with considerable additional costs.

Usually, the correct function of an electronic camera is verified in that defined patterns are filmed with the camera. They typically contain different, calibrated color charts, patterns with a high contrast extent and homogeneously illuminated surfaces. For example, an Ulbricht sphere with large-format patterns is used which is filmed in a darkened room.

Such equipment is, however, frequently too bulky to be used at the film location. In addition, special analysis software is required for the evaluation of the taken test data which requires the presence of a computer and special technical knowledge of the operator for its operation.

It is therefore the object of the invention to provide an image sensor and a method for its operation which allow a function monitoring of an electronic camera, in particular in ongoing operation.

This object is satisfied by the features of claim 1 and in particular by an image sensor, in particular a CMOS image sensor, for electronic cameras, having a plurality of light-sensitive pixels arranged in rows and columns, wherein all or at least some of the pixels of a column are connected to a respective common column line, and wherein the image sensor has a respective signal preprocessing device for one or more of the column lines to process exposure signals generated by the pixels which can be applied to the respective column line. The image sensor is made selectively to apply one of at least two test input signals to the column lines.

A simulation of specific exposure situations preset by the magnitude of the test input signals can be achieved for each pixel by the application of the test input signals. Defined output signals of the pixels are replicated in this process. A check can thereby be made whether defects or irregularities are present, for example, in the region of the internal sensor leads, for example the column lines, or in the region of the subsequent signal preprocessing, for instance with individual amplifiers, sample and hold members or analog/digital converters.

The image sensor is preferably made to apply the test input signals to the column lines without any substantial voltage drop, i.e. the application of the test input signals to the column lines takes place directly by means of correspondingly configured switches without any substantial voltage drop. Unwanted noise sources and deviations in the actually fed in test input signals between the different column lines due to production tolerances are hereby avoided. In other words, it is ensured by the use of switches which allow a transfer of the test input signals without any voltage drop that the same respective test input signal is applied to the different column lines. More exact measurements are hereby possible. It is in particular preferred for this purpose if the test input signals are not reduced by the respective gate/source voltage of an interposed transistor.

To obtain particularly exact measurement results, it is furthermore preferred if the respective voltage source used for producing the test input signals is a voltage source regulated independently of the supply voltage of the image sensor.

In accordance with a preferred embodiment, each column line is connected to a respective first switch and to a respective second switch such that the respective column line can be connected via the first switch and the second switch selectively to at least one first test signal line or one second test signal line. An association of different test input signals with the column lines can thereby be achieved in a simple manner.

In accordance with a preferred embodiment, the first switches are connected to a first control line for the common control of the first switches and the second switches are connected to a second control line for the common control of the second switches. The same test input signal can be applied to each column line at a specific time with this arrangement.

In accordance with a further embodiment of the invention, the column lines can be connected to different test signal lines. It is thereby possible, for example, to produce vertical lines or stripe patterns in a test image.

Vertical stripe patterns are in particular important to be able to recognize echoes or ghost images. In cameras which simultaneously have a high number of light-sensitive elements or a high frame rate, image sensors are thus used which have a plurality of outputs A which can be read out in parallel—and thus faster—in a respective readout cycle. In addition, the columns can be divided into column groups which each have a plurality of columns, with the number of the columns in each of the column groups corresponding to the number of the outputs A. In this connection, the columns are associated with the outputs of the image sensor in the manner of unit matrices disposed next to one another so that the columns with the numbers N, N+A, N+2A, etc. are each associated with the output with the number N, with the columns and the outputs each being numbered continuously.

With an image sensor with 32 outputs and with a division of the columns into column groups, for example, in a first trigger cycle, the first column of the image sensor which corresponds to the first column of the first column group is thus associated with the first output. The second column of the image sensor which corresponds to the second column of the first column group is associated with the second output, etc. up to the 32nd column of the image sensor which corresponds to the 32nd column of the first column group which is associated with the 32nd output. In the following readout cycle, the 33rd column of the image sensor which corresponds to the first column of the second column group is again associated with the first output; the 34th column of the image sensor which corresponds to the second column of the second column group is again associated with the second output, etc.

Each of the outputs of the image sensor has its own output amplifier, with the signals of the pixels being amplified by the output amplifier in order subsequently to be digitized.

It is known that the respective signal currently applied to an output amplifier always includes a small portion, disposed in the thousandths range, for example, of the signal directly amplified beforehand by the respective output amplifier, said portion being caused, for example, by thermal effects and/or feedback effects on the power supply. Whereas the interfering influence of the signal of the precursor pixel with an image sensor having a single output on large differences between two directly successively amplified signals admittedly produces a kind of blur in the image which cannot be perceived by the eye, the portion of the signal of the respective precursor pixel with an image sensor with a plurality of outputs—that is the portion of the directly previously amplified signal—makes itself noticeable in the amplification of the signal of that pixel which is arranged remote from the precursor signal by the number of outputs A.

For example, in an image which shows a bright candle flame in an otherwise dark room, a visual echo of the candle flame is generated which is laterally offset from the original candle flame. Such echo-type image interference is called a ghost image. In the image sensor described above with 32 outputs, the echo is thus offset from the original by 32 pixels.

With the help of the present invention, any desired vertical stripe patterns can now be produced with which such interference in the signal processing chain can be recognized.

A register which is made to control the first and second switches for each column separately can be provided for a connection of the column lines to different test signal lines so that the respective column line is selectively connected to the first test signal line, to the second test signal line or to no test signal line. A pattern can be stored in the register which controls the application of the test input signals. This pattern can be static, i.e. the same for all rows, or also different or changeable row-wise.

Furthermore, the image sensor can have at least one evaluation device which is connected to a common output of the signal preprocessing device, with the evaluation device being made to evaluate the test input signals after their processing in the signal preprocessing devices. The test difference signals or test images thus generated can hereby be evaluated in real time, in particular during the ongoing operation. A space-saving construction is achieved by the accommodation on the sensor and a falsification of the test signals by large line lengths is avoided.

The image sensor can also be made selectively to apply one of more than two test input signals (e.g. one of four test inputs signals) to the column lines. In this case, a corresponding number of switches, test signal lines and/or voltage sources is preferably provided.

The invention also relates to a method for operating an image sensor in accordance with the invention.

Furthermore, the invention relates to an image sensor unit having an image sensor of the above-explained kind and having at least one first external voltage source and one second external voltage source for producing the named test input signals, wherein the external voltage sources are connected to associated connections of the image sensor, and wherein the respective external voltage source is a voltage source regulated independently of the supply voltage of the image sensor.

Further advantageous embodiments of the invention are set forth in the dependent claims, in the description and in the drawing.

The invention will be described in the following with reference to embodiments and to the drawing.

BRIEF DESCRIPTION OF THE DRAWINGS

There are shown, schematically in each case.

DETAILED DESCRIPTION OF THE INVENTION

Figure 1:
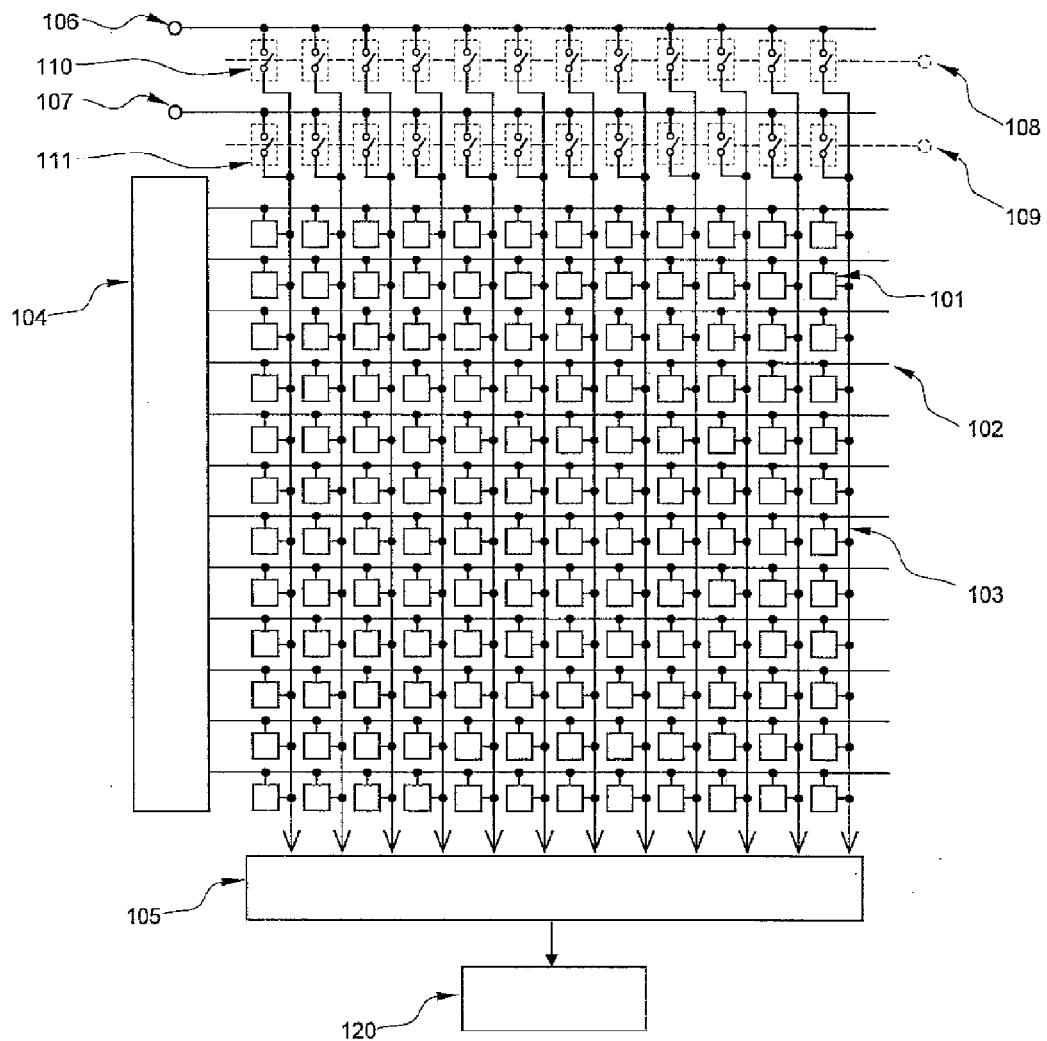
FIG. 1 a first embodiment of an image sensor in accordance with the invention.
Figure 2:
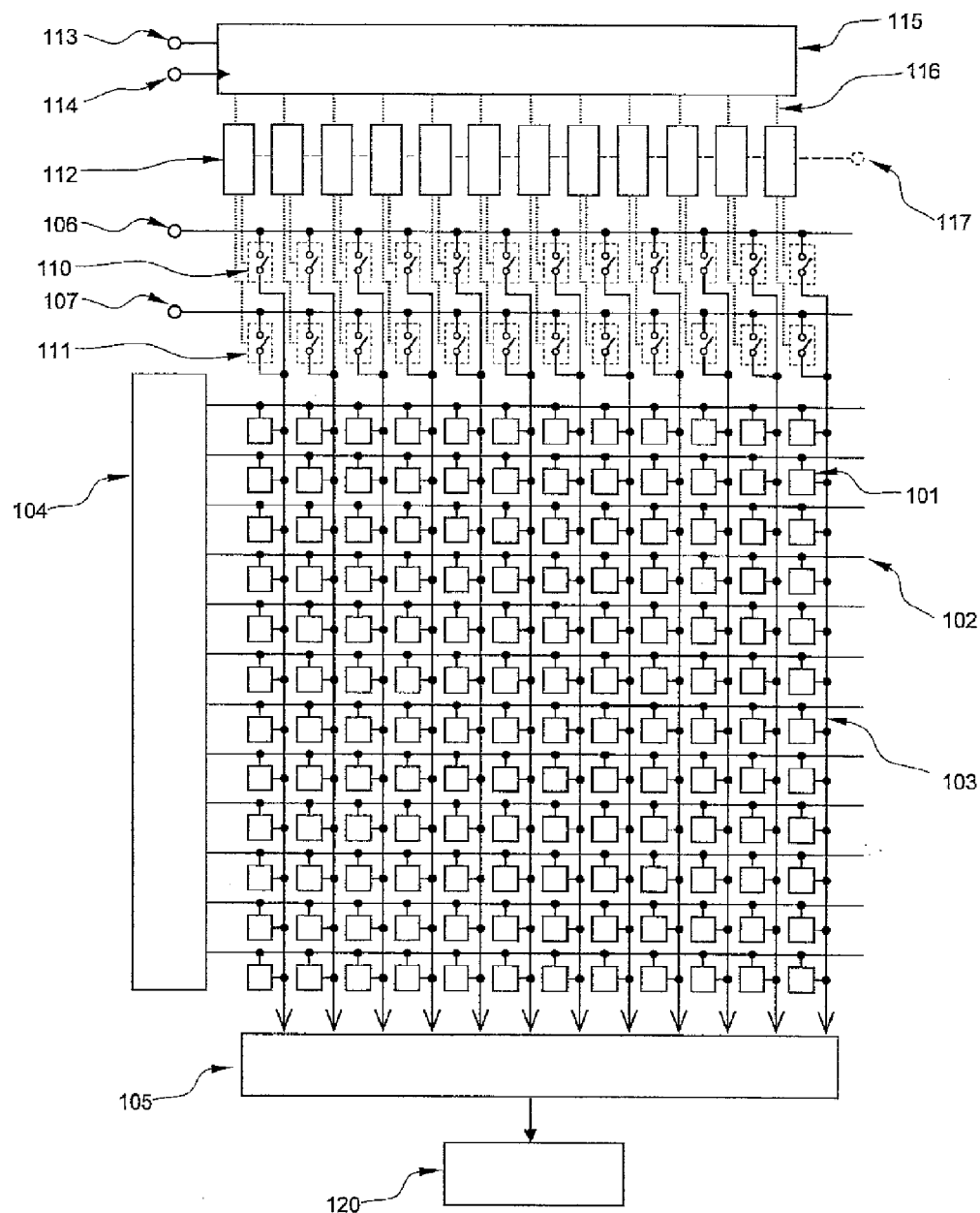
FIG. 2 a second embodiment of an image sensor in accordance with the invention.
Figure 3:
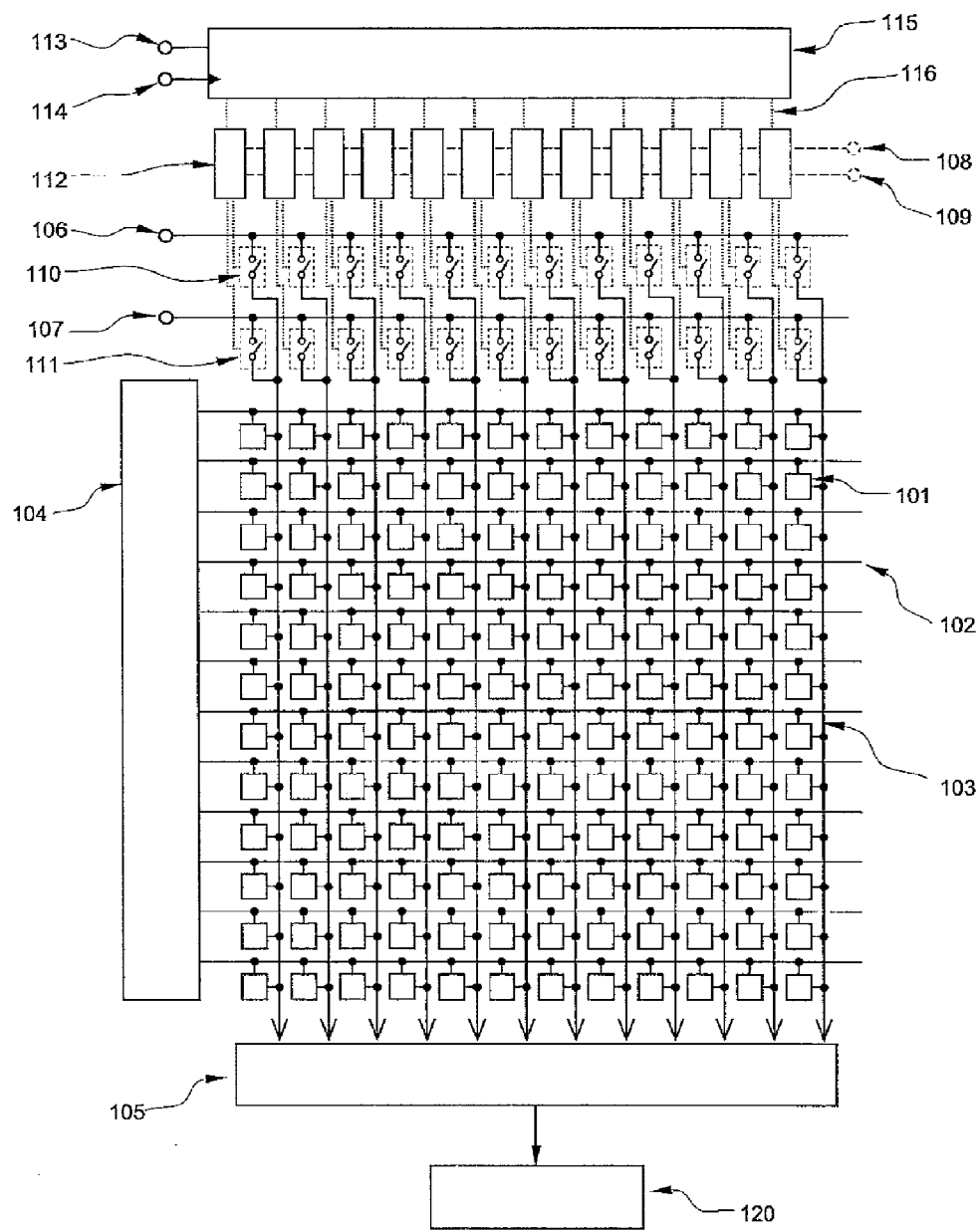
FIG. 3 a third embodiment of an image sensor in accordance with the invention.

The image sensor shown in FIGS. 1 to 3 can be used both with still image cameras and with motion picture cameras and has a plurality of light-sensitive pixels 101 which are arranged in rows (shown horizontally here) and in columns (shown vertically here). The pixels 101 of each column are connected to a respective column line 103. All the pixels of a row are connected to a respective row line 102. A row selection circuit 104 enables the selection of a specific row line 102 so that all the pixels of the respective row are connected via the respective column lines 103 to a respective signal preprocessing device which in particular includes a column amplifier.

The signal preprocessing devices present for each column line 103 are not shown individually here, but rather as a component of a signal preprocessing unit 105 which can moreover also include sample and hold members and/or analog/digital converters for digitizing the signals generated by the column amplifiers.

The column lines 103 are each connectable to a first test signal line 106 via first switches 110. The column lines 103 are moreover each connectable to a second test signal input via second switches 111. Test input signals can be applied to the column lines 103 via the first test signal line 106 and the second test signal line 107. The signal preprocessing devices of the signal preprocessing unit 105 are made not only to process the electrical signals produced by the pixels 101 and applied to the respective column line 103 (i.e. the exposure signals), but also the named test input signals.

The three embodiments substantially differ by the control of the switches 110, 111 which will be explained in more detail in the following.

The signal preprocessing unit 105 has a common output of the signal preprocessing devices to which an evaluation unit 120 is connected for evaluating the test input signals.

Although only one single signal preprocessing unit 105 is shown for the image sensor shown here, it is naturally also possible to provide in a known manner a plurality of signal preprocessing units working in parallel instead of a single signal preprocessing unit to enable a faster reading out of the image sensor. The common outputs of the plurality of signal preprocessing units are then correspondingly connected to the evaluation unit 120.

In the following, the operation of the image sensor in accordance with the invention will now be described in accordance with the first embodiment.

In the first embodiment in accordance with FIG. 1, a first control line 108 is provided for the common control of the first switches 110 and a second control line 109 is provided for the common control of the second switches 111. Either the first or the second control line 108 and 109 respectively has a control signal applied to apply the test signals.

As was initially mentioned, in the CDS process, two values are read out of each pixel, namely a signal value and a reference value. The difference of these two values is then amplified and digitized in an analog/digital converter. Two corresponding test signal values must accordingly also be provided.

To carry out an example image sensor check, a first voltage source is applied to the first test signal line 106 and a second voltage source is applied to the second test signal line 107. The voltage sources, which are not shown, can be either internal voltage sources integrated on the image sensor or external voltage sources. The first voltage source, for example, delivers a voltage of 2 V and the second voltage source delivers a voltage of 1.5 V. The regulation of the voltage sources is to be configured so that the test voltages are also stable and at low noise under load.

The first switches 110 are actuated by a corresponding control via the first control line 108 so that now the first voltage source is applied to the voltage lines 10 with a voltage of 2 V. The image sensor is subsequently read out so that the voltage of 2 V is read into the respective signal preprocessing devices and is buffered as a reference value.

Subsequently, the connection of the column line 103 to the first test signal line is interrupted and a connection to the second voltage source (1.5 V) is established by an actuation of the second switches 111 by means of the second control line 109. This voltage is read into the respective signal preprocessing devices as a signal value and is buffered.

The voltage of 2 V here therefore corresponds to a reference value and the voltage of 1.5 V to a signal value. A test difference signal which corresponds to the difference (0.5 V) of the two test input signals results from the difference of these two values at the output of the respective signal processing device (e.g. after amplification). The test difference signals produced in the individual signal preprocessing devices are digitized and are output at the evaluation unit 120.

These steps are repeated in accordance with the number of rows of the image sensor so that ultimately a first test image can be produced from the test difference signals which corresponds to a bright input image. This first test image can be analyzed by the evaluation unit 120. The digitized test difference signals can, for example, be compared with a predetermined reference value.

The above-described procedure is preferably repeated, with, in contrast to the first passage, the first test voltage of 2 V being used for the production both of the reference value and of the signal value, i.e. the column lines 103 are in both cases connected to the first test signal line 106 via the first switches 110. Due to the difference formation, the test difference signal in this case amounts to 0 V, which is likewise digitized and is output to the evaluation unit 120. The second test image generated in this manner corresponds to a black input image. This second test image can be analyzed separately in the evaluation unit 120 or can be compared with the first test image.

Test images which have horizontal lines can be produced by a line-wise different control of the switches 110, 111. If therefore a test image line is produced with a reference value of 2 V and a signal value of 1.5 volts, whereas in the subsequent nine test image lines the 2 V applied to the first test signal line 106 are used both for the reference value and for the signal value, a test image arises in which every tenth line is bright, while all nine lines disposed therebetween are dark.

The second embodiment (FIG. 2) differs from the first embodiment (FIG. 1) in that the first and second switches 10, 111 are not controlled via common control lines 108, 109, but it can rather be selected separately for each column whether the associated column line 103 should be connected to the first test signal line 106 or to the second test signal line 107. In other words, the image sensor in accordance with FIG. 2 is made to apply the test input signals variably column-wise to the column line 103, i.e. without a fixed preassignment, for example due to a corresponding relay of associated transistors.

For this purpose, a register 115 having a data input 113 is provided via which data patterns can be loaded into the register 115. The size of the register 115 is determined from the number of columns and rows of the image sensor. The data pattern stored in the register 115 defines which of the two test signal lines 106, 107 should be connected to a specific column line 103. The register 115 therefore serves as a control register.

The register 115 has a number of register outputs 116 which correspond to the number of columns, whose respective condition can be determined by the data pattern and which are connected to a respective control logic 112. The control logics 112 are connected to a common control line 117. If now a signal is applied to this common control line 117, each control logic 112 actuates either a first switch 110 or a second switch 111 in dependence on the condition of the associated register output 116.

The register 115 furthermore has a clock input 114 so that a different line of the data pattern is used for each test image line to control the register outputs 116. Rectangular patterns or any other patterns can be produced in addition to test images with vertical stripes by corresponding data patterns.

Alternatively, a register 115 can also be used which is adapted only to store single-line data patterns. After the reading out of one or more rows with a specific data pattern, a different data pattern can be loaded into the register 115 via the data input 113 so that test images with horizontal and vertical structures can also be produced with a single-line register.

The third embodiment (FIG. 3) largely corresponds to the second embodiment (FIG. 2) and differs in that the control logics 112 are connected to two control lines 108, 109 instead of to the common control line 117. It is thereby possible not only to apply the test voltages to the column lines 103 in dependence on the data patterns stored in the register 115, but also alternatively to connect one of the test signal lines 1206 or 107 to all column lines 103 independently of the content of the register 115 by selective control of all first switches 110 or of all second switches 111 in a similar manner as in the first embodiment in accordance with FIG. 1.

For this purpose, a corresponding evaluation of the conditions of the two control lines 108, 109 takes place in the control logics 112. For example, the encoding can take place in accordance with the following table:

| Control line 108 | Control line 109 | Test signal line connected to the column lines 103 |
|---|---|---|
| 0 | 0 | No test signal line |
| 1 | 0 | First test signal line 106 |
| 0 | 1 | Second test signal line 107 |
| 1 | 1 | Test signal line as per data pattern |

The infeed of the test voltages from the central test signal lines 106, 107 ensures in all embodiments that all the column lines 103 connected to a respective test signal line 106, 107 are acted on by exactly the same test voltage. Artifacts are thus avoided with respect to solutions in which test signals are individually produced for every column and thus slightly differ from one another due to the component tolerances despite nominally the same voltage. The switches 110, 111 ensure a direct, largely voltage drop-free and noise-free infeed of the test voltages into the column lines 103.

In all embodiments, a continuous monitoring of the image sensor can in particular take place during the regular operation of the camera if one or two test images are produced in the manner described above between the reading out of two exposure signals (i.e. between the producing of two sets of signal values following one another and optionally also of reference values). The pixels of the image sensor can be deactivated during the reading out of the test images.

An automatic evaluation of the test image or images can then take place in the evaluation unit 120 for recognizing defects or image errors, for example by an analysis by means of suitable processes on the basis of a Fourier analysis or a comparison with stored reference images.

On a recognition of defects or image errors, an optical or acoustic signal can be output to the operator of the camera.

Analog to the use of two test voltages, it is naturally also possible in the above-explained embodiments to use more than two test voltages, i.e. to apply more than two test voltages selectively to the column lines 103. If, for example, four test voltages are used, two bits are respectively provided per column in the register 115 in accordance with FIGS. 2 and 3 to be able to select one of the four test voltages for each column line 103.

| Reference numeral list | |
|---|---|
| 101 | pixel |
| 102 | row line |
| 103 | column line |
| 104 | row selection circuit |
| 105 | signal preprocessing unit |
| 106 | first test signal line |
| 107 | second test signal line |

| Reference numeral list | |
|---|---|
| 108 | first control line |
| 109 | second control line |
| 110 | first switch |
| 111 | second switch |
| 112 | control logic |
| 113 | data input |
| 114 | clock input |
| 115 | register |
| 116 | register output |
| 117 | common control line |
| 120 | evaluation unit |

The invention claimed is:

1. An image sensor, in particular a CMOS image sensor, for electronic cameras, having a plurality of light-sensitive pixels (101) arranged in rows and columns, wherein all or at least some of the pixels (101) of a column are connected to a respective common column line (103), and wherein the image sensor has a respective signal preprocessing device (105) for one or more of the column lines (103) to process exposure signals generated by the pixels which can be applied to the respective column line (103), wherein the image sensor is made selectively to apply one of at least two test input signals to the column lines (103), wherein each column line (103) is connected at least to a respective first switch (110) and a respective second switch (111), wherein the respective column line (103) can be selectively connected via the first switch (110) to a first test signal line (106) or via the second switch (111) to a second test signal line (107);

wherein a register (115) is provided which is made to control the first and second switches (110, 111) for each column line (103) separately so that the respective column line (103) is selectively connected to the first test signal line (106), to the second test signal line (107) or to no test signal line;

wherein a respective control logic (112) is provided between the register (115) and the first and second switches (110, 111) of each column line (103); wherein the control logics (112) at the input side are connected to a respective register output (116) and to a common line (117); and wherein the control logics (112) are made to actuate in dependence on a control signal at the common control line (117) either the respective first switch (110) or the respective second switch (111) in dependence on the condition of the respective register output (116).

2. An image sensor in accordance with claim 1, wherein the image sensor is made to apply the test input signals to the column lines (103) without a voltage drop.

3. An image sensor in accordance with claim 1, wherein the first switches (110) are connected to a first control line (108) for the common control of the first switches (110); and wherein the second switches (111) are connected to a second control line (109) for the common control of the second switches (111).

4. An image sensor in accordance with claim 1, wherein the first switches (110) are provided between the first test signal line (106) and the respective column line (103); and wherein the second switches (111) are provided between the second test signal line (107) and the respective column line (103).

5. An image sensor in accordance with claim 1, wherein the switches (110, 111) are integrated in the image sensor.

6. An image sensor in accordance with claim 1, wherein the image sensor has at least one first voltage source and one second voltage source for producing the test input signals;

wherein the respective voltage source is a voltage source regulated independently of a supply voltage of the image sensor.

7. An image sensor in accordance with claim 6, wherein the first voltage source is connected or connectable to the first test signal line (106) and the second voltage source is connected or connectable to the second test signal line (107).

8. An image sensor in accordance with claim 1, wherein the image sensor has connections for at least one first and one second external voltage source for producing the test input signals.

9. An image sensor in accordance with claim 1, wherein the column lines (103) can be connected to different test signal lines (106, 107).

10. An image sensor in accordance with claim 1, wherein the column lines (103) can be acted on line-wise by different test input signals.

11. An image sensor in accordance with claim 1, wherein the signal preprocessing devices (105) is made also to process the test input signals applied to the column lines (103).

12. An image sensor in accordance with claim 1, wherein the image sensor (103) has at least one evaluation device (120) which is connected to an output of the signal preprocessing device (105); and wherein the evaluation device (120) is made to evaluate the test input signals after their processing in the signal preprocessing devices (105).

13. An image sensor in accordance with claim 1, wherein the respective signal preprocessing device (105) includes at least one column amplifier and/or one sample and hold member.

14. A method for operating an image sensor having a plurality of light-sensitive pixels (101) arranged in rows and columns, wherein all or at least some of the pixels (101) of a column are connected to a respective common column line (103); and wherein the image sensor has a respective signal preprocessing device (105) for one or more of the column lines (103) to process exposure signals produced by the pixels which can be applied to the respective column line (103); and wherein the image sensor is made selectively to apply one of at least two test input signals to the column lines (103), comprising the steps:
applying at least one respective first test input signal to the column lines (103);
buffering the respective first test input signal in the respective signal preprocessing device (105);
applying at least one respective second test input signal to the column lines (103);
buffering the respective second test input signal in the respective signal preprocessing device (105);
determining a respective test difference signal from the buffered first test input signal and the buffered second test input signal in the respective signal preprocessing device; and
evaluating the respective test difference signal.

15. A method in accordance with claim 14, wherein the image sensor has at least one first test signal line (106) and one second test signal line (107); wherein each column line (103) is connected via a respective first switch (110) and a respective second switch (111) selectively to the first test signal line (106) or to the second test signal line (107) to switch the first test input signal and the second test input signal to the respective column line (103).

16. A method in accordance with claim 14, wherein the application and buffering of the respective first test input signal, the application and buffering of the respective second test input signal and the determination of the respective test difference signal are repeated a multiple of times; and wherein the test difference signals determined in this manner are output by the signal preprocessing device in a manner which corresponds to an exposure signal read-out process.

17. A method in accordance with claim 14, wherein the evaluation of the respective processed test difference signal includes a comparison with a preset reference value.

18. A method in accordance with claim 14, wherein column-wise different test input signals are applied to the column lines (103).

19. A method in accordance with claim 14, wherein row-wise different test input signals are applied to the column lines (103).

20. A method in accordance with claim 14, wherein the exposure signals of the pixels are read out image-wise; and wherein the test input signals are applied to the column lines (103) between the exposure signal read-out processes of two sequential images.

21. A method in accordance with claim 14, wherein the pixels (101) are deactivated during the application of the test input signals to the column lines (103).

22. An image sensor, in particular a CMOS image sensor, for electronic cameras, having a plurality of light-sensitive pixels (101) arranged in rows and columns, wherein all or at least some of the pixels (101) of a column are connected to a respective common column line (103), and wherein the image sensor has a respective signal preprocessing device (105) for one or more of the column lines (103) to process exposure signals generated by the pixels which can be applied to the respective column line (103),
wherein the image sensor is made selectively to apply one of at least two test input signals to the column lines (103), wherein each column line (103) is connected at least to a respective first switch (110) and a respective second switch (111), wherein the respective column line (103) can be selectively connected via the first switch (110) to a first test signal line (106) or via the second switch (111) to a second test signal line (107);
wherein a register (115) is provided which is made to control the first and second switches (110, 111) for each column line (103) separately so that the respective column line (103) is selectively connected to the first test signal line (106), to the second test signal line (107) or to no test signal line;
wherein a respective control logic (112) is provided between the register (115) and the first and second switches (110, 111) of each column line (103); wherein the control logics (112) at the input side are connected to a respective register output (116) and to a first common control line (108) and to a second common control line (109); and wherein the control logics (112) are made to actuate in dependence on control signals at the first control line (108) and at the second control line (109) either the respective first switch (110) or the respective second switch (111) in dependence on the condition of the respective register output (116) or to actuate all first switches (110) or all second switches (111) independently of the condition of the respective register output (116).

23. An image sensor for electronic cameras, having a plurality of light-sensitive pixels (101) arranged in rows and columns, wherein all or at least some of the pixels (101) of a column are connected to a respective common column line (103), and wherein the image sensor has a respective signal preprocessing device (105) for one or more of the column lines (103) to process exposure signals generated by the pixels which can be applied to the respective column line (103), the image sensor being supplied with a supply voltage;

wherein the image sensor is adapted to selectively apply one of at least a first and a second test input signal to the respective column line (103), the first test input signal being provided on a first test signal line (106) and the second test input signal being provided on a second test signal line (107), wherein the same first test signal line (106) is provided for all column lines (103) and the same second test signal line (106) is provided for all column lines (103);

wherein at least a respective first switch (110) and a respective second switch (111) are associated with each column line (103), a first terminal of the associated first switch (110) being connected to the respective column line (103) and a second terminal of the associated first switch (110) being connected to the first test signal line (106), and a first terminal of the associated second switch (111) being connected to the respective column line (103) and a second terminal of the associated second switch (111) being connected to the second test signal line (107);

wherein the respective column line (103) selectively can be connected via the associated first switch (110) to the first test signal line (106) to apply the first test input signal to the respective column line (103), or via the associated second switch (111) to the second test signal line (107) to apply the second test input signal to the respective column line (103);

wherein the image sensor has at least a first voltage source for producing the first test input signal and a second voltage source for producing the second test input signal, each of the first voltage source and the second voltage source being a voltage source regulated independently of the supply voltage of the image sensor.

24. An image sensor unit for electronic cameras, comprising an image sensor which has a plurality of light-sensitive pixels (101) arranged in rows and columns, wherein all or at least some of the pixels (101) of a column are connected to a respective common column line (103), and wherein the image sensor has a respective signal preprocessing device (105) for one or more of the column lines (103) to process exposure signals generated by the pixels which can be applied to the respective column line (103), the image sensor being supplied with a supply voltage;

wherein the image sensor is adapted to selectively apply one of at least a first and a second test input signal to the respective column line (103), the first test input signal being provided on a first test signal line (106) and the second test input signal being provided on a second test signal line (107), wherein the same first test signal line (106) is provided for all column lines (103) and the same second test signal line (106) is provided for all column lines (103);

wherein at least a respective first switch (110) and a respective second switch (111) are associated with each column line (103), a first terminal of the associated first switch (110) being connected to the respective column line (103) and a second terminal of the associated first switch (110) being connected to the first test signal line (106), and a first terminal of the associated second switch (111) being connected to the respective column line (103) and a second terminal of the associated second switch (111) being connected to the second test signal line (107);

wherein the respective column line (103) selectively can be connected via the associated first switch (110) to the first test signal line (106) to apply the first test input signal to the respective column line (103), or via the associated second switch (111) to the second test signal line (107) to apply the second test input signal to the respective column line (103);

wherein the image sensor unit further comprises at least a first voltage source for producing the first test input signal and a second voltage source for producing the second test input signal, with the first voltage source and the second voltage source being connected to associated connectors of the image sensor, each of the first voltage source and the second voltage source being a voltage source regulated independently of the supply voltage of the image sensor.

\* \* \* \* \*